United States Patent
Yu et al.

(10) Patent No.: US 12,536,713 B2
(45) Date of Patent: Jan. 27, 2026

(54) SYSTEMS AND METHODS FOR CONTROLLABLE IMAGE GENERATION

(71) Applicant: Salesforce, Inc., San Francisco, CA (US)

(72) Inventors: Ning Yu, Palo Alto, CA (US); Can Qin, Somerville, MA (US); Shu Zhang, Fremont, CA (US); Yihao Feng, Austin, TX (US); Xinyi Yang, San Francisco, CA (US); Ran Xu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 222 days.

(21) Appl. No.: 18/477,764

(22) Filed: Sep. 29, 2023

(65) Prior Publication Data
US 2024/0386623 A1    Nov. 21, 2024

Related U.S. Application Data

(60) Provisional application No. 63/502,631, filed on May 16, 2023.

(51) Int. Cl.
| | | |
|---|---|---|
| *G06T 1/20* | (2006.01) |
| *G06T 5/20* | (2006.01) |
| *G06T 11/00* | (2006.01) |
| *G06V 10/771* | (2022.01) |

(52) U.S. Cl.
CPC ............... *G06T 11/00* (2013.01); *G06T 5/20* (2013.01); *G06V 10/771* (2022.01); *G06T 2207/20081* (2013.01); *G06T 2207/20084* (2013.01)

(58) Field of Classification Search
CPC . G06T 11/00; G06T 5/20; G06T 2207/20081; G06T 2207/20084; G06V 10/771
See application file for complete search history.

(56) References Cited

U.S. PATENT DOCUMENTS

| | | | | |
|---|---|---|---|---|
| 11,301,727 B2* | 4/2022 | Hu | ........................ | G06V 10/454 |
| 11,403,876 B2* | 8/2022 | Tai | ............................. | G06T 5/20 |
| 11,599,972 B1* | 3/2023 | Xu | .......................... | G06N 3/045 |
| 11,967,134 B2* | 4/2024 | Yao | ......................... | G06V 10/40 |

(Continued)

OTHER PUBLICATIONS

Lvmin Zhang and Maneesh Agrawala. Adding conditional control to text-to-image diffusion models. arXiv preprint arXiv:2302.05543, 2023.

*Primary Examiner* — Cheng Yuan Tseng
(74) *Attorney, Agent, or Firm* — Haynes and Boone, LLP

(57) ABSTRACT

Embodiments described herein provide a method of image generation. The method includes a fixed diffusion model, and a trainable diffusion model. The fixed diffusion model may be pretrained on a large training corpus. The trainable diffusion model may be used to control the image generation of the fixed diffusion model by modifying internal representations of the fixed diffusion model. A task instruction may be provided in addition to a text prompt, and the task instruction may guide the trainable diffusion model together with the visual conditions. The visual conditions may be adapted according to the task instruction. During training, a fixed number of task instructions may be used. At inference, unseen task instructions may be used by combining convolutional kernels of the visual condition adapter.

20 Claims, 13 Drawing Sheets

(56) References Cited

U.S. PATENT DOCUMENTS

| | | | |
|---|---|---|---|
| 11,972,638 B2* | 4/2024 | Zhang | G06V 10/454 |
| 12,181,552 B2* | 12/2024 | Schwab | G01R 33/56341 |
| 12,211,304 B2* | 1/2025 | Li | G06N 3/045 |
| 12,310,713 B2* | 5/2025 | Park | A61B 5/055 |
| 12,322,013 B2* | 6/2025 | Do | G06V 10/764 |
| 2020/0193270 A1* | 6/2020 | Wu | G06N 3/082 |
| 2021/0312173 A1* | 10/2021 | Huang | G07D 7/12 |
| 2023/0095092 A1* | 3/2023 | Xiao | G06T 5/60 |
| | | | 382/254 |
| 2023/0109379 A1* | 4/2023 | Kreis | G06T 5/70 |
| | | | 382/157 |
| 2023/0368337 A1* | 11/2023 | Karras | G06N 3/044 |
| 2024/0037708 A1* | 2/2024 | Chen | H04N 23/631 |
| 2024/0153259 A1* | 5/2024 | Motilan | G06V 10/751 |
| 2024/0161248 A1* | 5/2024 | Naik | G06T 5/50 |
| 2024/0161462 A1* | 5/2024 | Gandelsman | G06T 5/60 |
| 2024/0256831 A1* | 8/2024 | Li | G06N 3/045 |
| 2024/0264723 A1* | 8/2024 | Davidson | G06N 3/045 |
| 2024/0273932 A1* | 8/2024 | Tao | G06V 10/764 |
| 2024/0282025 A1* | 8/2024 | Park | G06F 40/151 |
| 2024/0289998 A1* | 8/2024 | Wang | G06V 10/774 |
| 2024/0331105 A1* | 10/2024 | Khoreva | G06T 11/60 |
| 2024/0346234 A1* | 10/2024 | Zhang | G06F 40/166 |
| 2025/0086843 A1* | 3/2025 | Zafar | G06N 3/0464 |
| 2025/0173613 A1* | 5/2025 | Oktay | G16H 15/00 |

* cited by examiner

|  | Canny ▼ | HED ▼ | Normal ▼ | Depth ▼ | Pose ▼ | Segmentation ▼ |
|---|---|---|---|---|---|---|
| UniControl | 0.546 | 0.466 | 0.623 | 0.654 | 0.741 | 0.693 |
| ControlNet | 0.577 | 0.582 | 0.778 | 0.700 | 0.747 | 0.693 |

FIG. 11

SYSTEMS AND METHODS FOR CONTROLLABLE IMAGE GENERATION

CROSS REFERENCE(S)

The instant application is a nonprovisional of and claim priority under 35 U.S.C. 119 to U.S. provisional application No. 63/502,631, filed May 16, 2023, which is hereby expressly incorporated by reference herein in its entirety.

TECHNICAL FIELD

The embodiments relate generally to machine learning systems for image generation, and more specifically to controllable image generation with diffusion models.

BACKGROUND

Machine learning systems have been widely used in generative tasks such as image generation. Denoising diffusion models (DDMs) are currently used for generating images given a conditioning input such as a text prompt and/or input image. An input conditioning image may take on a variety of different forms such as a sketch, a relief map, etc. Each of these different types of input conditioning image may be associated with a different task which a user would like the DDM to perform. For example, generating an image based on an input sketch may be one such task. Existing methods, however, exhibit poor performance when attempting to use the same DDM for multiple different tasks. Training or fine-tuning a separate DDM for each task is expensive in terms of memory and computation. Therefore, there is a need for improved systems and methods of training and using models (e.g., DDMs) for controllable image generation.

BRIEF DESCRIPTION OF THE DRAWINGS

FIGS. 10-12 provide charts illustrating exemplary performance of different embodiments described herein.

Figure 1:
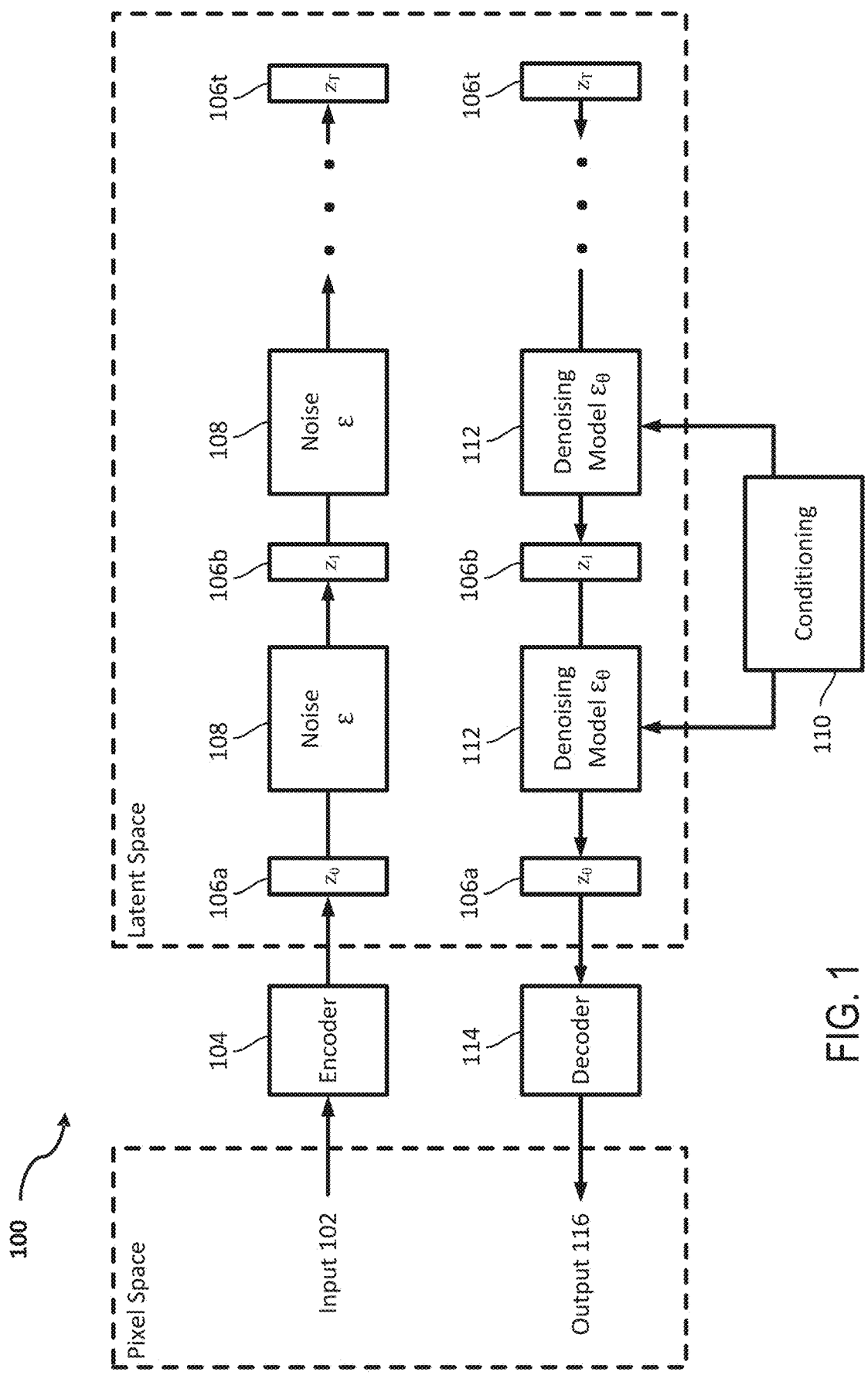
FIG. 1 is a simplified diagram illustrating an exemplary training framework for a denoising diffusion model, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Machine learning systems have been widely used in generative tasks such as image generation. Denoising diffusion models (DDMs) are currently used for generating images given a text prompt. The generation process may start with a random noise vector that is iteratively denoised by passing the vector through the DDM a number of times (e.g., 50 iterations) conditioned by the text prompt, which progressively produces a denoised image vector that results in the output image. The image generation process may be further controlled by an input conditioning image. The input conditioning image may take on a variety of different forms such as a sketch, a relief map, etc. Each of these different types of input conditioning image may be associated with a different task which a user would like the DDM to perform. For example, generating an image based on an input sketch may be one such task. Existing methods, however, exhibit poor performance when attempting to use the same DDM for multiple different tasks. Training or fine-tuning a separate DDM for each task is expensive in terms of memory and computation.

In view of the need for improved systems and methods of training and using models (e.g., DDMs) for controllable image generation, embodiments described herein provide a framework comprising a fixed DDM modulated by a single trainable DDM, to generate images for a number of tasks, without separate trainable DDMs for each task. Specifically, a first denoising diffusion model (DDM) may be pre-trained on a large general training dataset. This DDM may be fixed, such that its parameters are not updated for the remaining training process. A second DDM may start as a copy of the fixed DDM, but with trainable parameters. This trainable DDM may be used to control the image generation performed by the fixed DDM. This may happen through modulating internal image representations of the fixed DDM based on internal image representations of the trainable DDM. In some embodiments, the trainable DDM does not include internal decoder layers, and is therefore not a full copy of the fixed DDM.

In one embodiment, the trainable DDM may be configured to control the fixed DDM according to the input conditioning image and a specific task. To do so, the conditioning image is first input into an adapter which has trainable convolutional layers unique to each task. The output of the adapter is a set of feature maps, with one or more feature maps per defined task. The feature maps are input to the trainable diffusion model. A Task encoder encodes a text description of a task (e.g., "normal surface to image"). The generated task embedding is used to modulate convolutional layers generated by the trainable DDM. The modulated convolutional layers are then used to modulate the convolutional layers of the fixed DDM. For defined tasks, the task embedding may activate only the convolutional layers which are associated with that task (e.g., derived from the feature maps output from the adapter for that task).

Unseen tasks (e.g., tasks which are not in the training data) may be performed by the model that has gained knowledge through existing tasks. For example, a new task description may be input to the task encoder. Based on the semantics of the task description, the embedded task may activate a combination of feature maps associated with different tasks, with weights determined by the task encoder.

Embodiments described herein provide a number of benefits. For example, fewer compute and memory resources may be used in order to achieve the same or better results over a wider range of image related tasks. Rather than training individual models which required additional compute time and memory for storing model parameters, the unified model may perform a variety of tasks. Leveraging existing tasks in order to perform unseen tasks further improves computational efficiency. Therefore, with improved performance on efficiently training and performing image processing tasks, neural network technology in image processing is improved.

Figure 2:
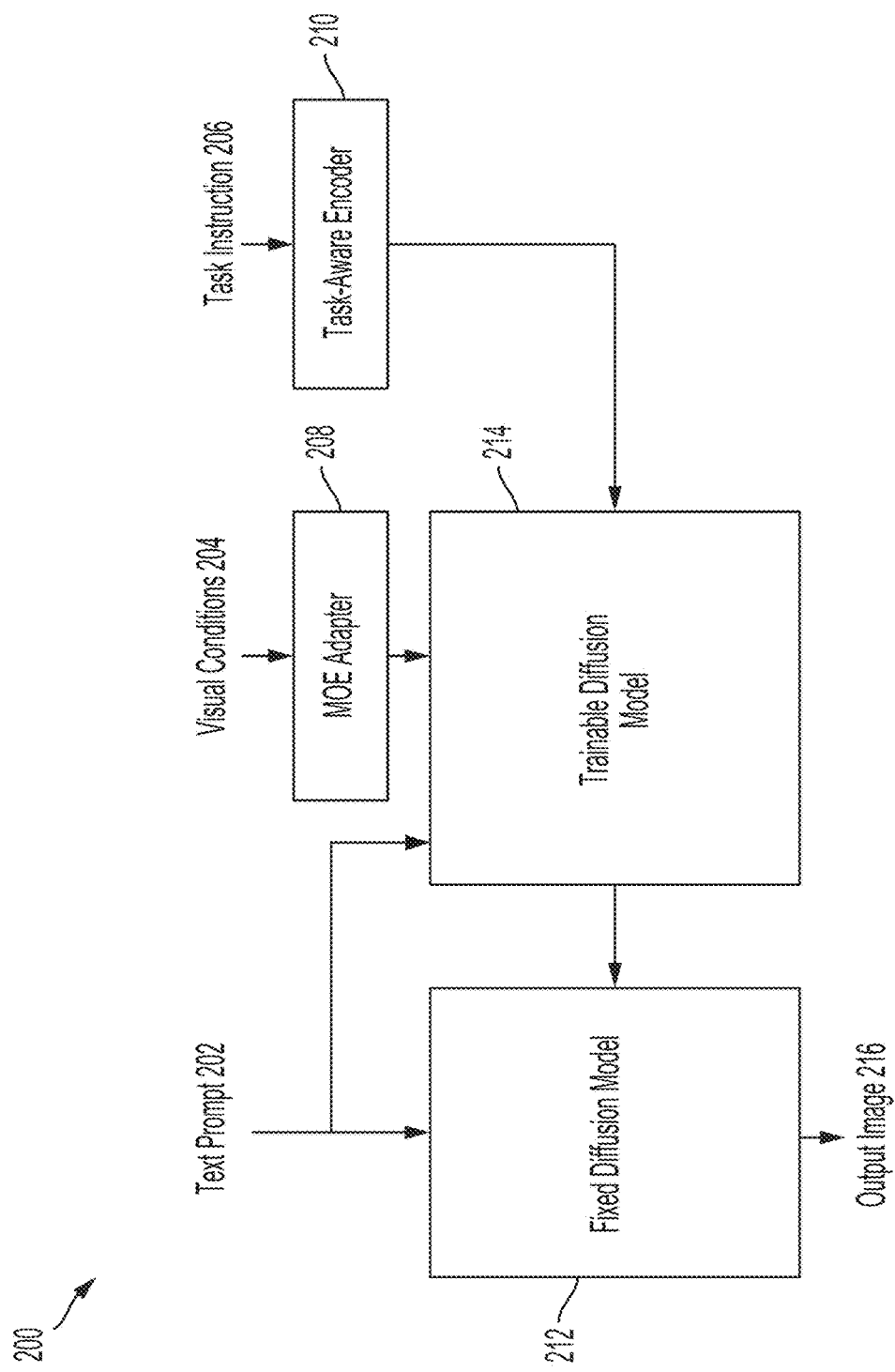
FIG. 2 is a simplified diagram illustrating a controllable image generation framework according to some embodiments.

FIG. 1 is a simplified diagram illustrating an exemplary training framework 100 for a DDM for generating or editing an image given a conditioning input such as a text prompt. In some embodiments, the fixed diffusion model 212 and/or the trainable diffusion model 214 described in FIG. 2 are trained or pre-trained according to training framework 100. In one embodiment, a denoising diffusion model is trained to generate an image (e.g., output 116) based on a user input (e.g., a text prompt in conditioning input 110). At inference, the denoising diffusion model may receive a text prompt describing image content, and start with a random noise vector as a seed vector, and the denoising model progressively removes "noise" from the seed vector as conditioned by the user input (e.g., text prompt) such that the resulting image may gradually align with the user input. Completely removing the noise in a single step would be infeasibly difficult computationally. For this reason, the denoising model is trained to remove a small amount of noise, and the denoising step is repeated iteratively so that over a number of iterations (e.g., 50 iterations), the image eventually becomes clear.

Framework 100 illustrates how such a diffusion model may be trained to generate an image given a prompt by gradually removing noise from a seed vector. The top portion of the illustrated framework 100 including encoder 104 and the noise ε 108 steps may only be used during the training process, and not at inference, as described below. A training dataset may include a variety of images, which do not necessarily require any annotations, but may be associated with information such as a caption for each image in the training dataset that may be used as a conditioning input 110. A training image may be used as input 102. Encoder 104 may encode input 102 into a latent representation (e.g., a vector) which represents the image.

In some embodiments, a diffusion model may be trained using the pixel-level data directly. In other embodiments, a diffusion model may be trained on scaled down versions of images. Generally some form of encoder 104, however, is desirable so that the image is in a format which is more easily consumed by the denoising model $\varepsilon_\theta$ 112. The remaining description of framework 100 presumes encoder 104 generates a latent vector representation of input 102.

Latent vector representation $z_0$ 106a represents the first encoded latent representation of input 102. Noise ε 108 is added to the representation $z_0$ 106a to produce representation $z_1$ 106b. Noise ε 108 is then added to representation $z_1$ 106b to produce an even noisier representation. This process is repeated T times (e.g., 50 iterations) until it results in a noised latent representation $z_T$ 106t. The random noise ε 108 added at each iteration may be a random sample from a probability distribution such as Gaussian distribution. The amount (i.e., variance) of noise ε 108 added at each iteration may be constant, or may vary over the iterations. The amount of noise ε 108 added may depend on other factors such as image size or resolution.

This process of incrementally adding noise to latent image representations effectively generates training data that is used in training the diffusion denoising model 112, as described below. As illustrated, denoising model $\varepsilon_\theta$ 112 is iteratively used to reverse the process of noising latents (i.e., perform reverse diffusion) from $z'_T$ 118t to $z'_0$ 118a. Denoising model $\varepsilon_\theta$ 112 may be a neural network based model, which has parameters that may be learned. Input to denoising model ε 112 may include a noisy latent representation (e.g., noised latent representation $z_T$ 106t), and conditioning input 110 such as a text prompt describing desired content of an output image, e.g., "a hand holding a globe." As shown, the noisy latent representation may be repeatedly and progressively fed into denoising model 112 to gradually remove noise from the latent representation vector based on the conditioning input 110, e.g., from $z'_T$ 118t to $z'_0$ 118a.

Ideally, the progressive outputs of repeated denoising models $\varepsilon_\theta$ 112 $z'_T$ 118t to $z'_0$ 118a may be an incrementally denoised version of the input latent representation $z'_T$ 118t, as conditioned by a conditioning input 110. The latent image representation produced using denoising model $\varepsilon_\theta$ 112 may be decoded using decoder 114 to provide an output 116 which is the denoised image.

In one embodiment, the output image 116 is then compared with the input training image 102 to compute a loss for updating the denoising model 112 via back propagation. In another embodiment, the latent representation 106a of input 102 may be compared with the denoised latent representation 118a to compute a loss for training. In another embodiment, a loss objective may be computed comparing the noise actually added (e.g., by noise ε 108) with the noise predicted by denoising model $\varepsilon_\theta$ 112. Denoising model $\varepsilon_\theta$ 112 may be trained based on this loss objective (e.g., parameters of denoising model $\varepsilon_\theta$ 112 may be updated in order to minimize the loss by gradient descent using backpropagation). Note that this means during the training process of denoising model $\varepsilon_\theta$ 112, an actual denoised image does not necessarily need to be produced (e.g., output 116 of decoder 114), as the loss is based on each intermediate noise estimation, not necessarily the final image.

In one embodiment, conditioning input 110 may include a description of the input image 102, and in this way denoising model $\varepsilon_\theta$ 112 learns to reproduce the image described. Alternatively (or in addition), conditioning input 110 may include a text prompt, a conditioning image, an attention map, or other conditioning inputs. These inputs may be encoded in some way before being used by denoising model $\varepsilon_\theta$ 112. For example, a conditioning image may be encoded using an encoder similar to encoder 104. Conditioning input 110 may also include a time step, which may be used to provide the model with a general estimate of how much noise remains in the image, and the time step may increment (or decrement) for each iteration.

In some embodiments, denoising model $\varepsilon_\theta$ 112 may be implemented through a structure referred to as "U-Net." The U-Net structure may include a series of convolutional layers and pooling layers which generate progressively lower resolution multi-channel feature maps. Each pooling layer and an associated one or more convolutional layers may be considered an encoder. The convolutional and pooling layers (i.e., encoders) may be followed by a series of up-sampling layers and convolutional layers which generate progressively higher resolution multi-channel feature maps. Each up-sampling layer and an associated one or more convolutional layers may be considered a decoder. The U-Net may also include skip connections, where outputs of each encoder layer are concatenated with the corresponding decoder layer, skipping the intermediate encoder/decoder layers. Skip connections allow information about the precise location of features extracted by convolutional (encoder) layers. The convolutional kernels for convolution layers, and up-sampling functions for the up-sampling layers may be learned during a training process. Conditioning inputs (e.g., images or a natural language prompt) may be used to condition the function of a U-Net. For example, conditioning inputs may be encoded and cross-attention may be applied between the encoded conditioning inputs and the feature maps at the encoder/decoder layers.

The direct output of denoising model $\varepsilon_\theta$ 112 (e.g., when implemented as a U-Net) may be an estimation of the noise present in the input latent representation, or more generally a noise distribution. In this sense, the direct output may not by a latent representation of an image, but rather of the noise. Using this estimated noise, however, an incrementally denoised image representation may be produced which may be an input to the next iteration of denoising model $\varepsilon_\theta$ 112.

At inference, denoising model $\varepsilon_\theta$ 112 may be used to denoise a latent image representation given a conditioning input 110. Rather than a noisy latent image representation $z_T$ 106t, the input to the sequence of denoising models may be a randomly generated vector which is used as a seed. Different images may be generated by providing different random starting seeds. The resulting denoised latent image representation after T denoising model steps may be decoded by a decoder (e.g., decoder 114) to produce an output 116 of a denoised image. For example, conditioning input may include a description of an image, and the output 116 may be an image which is aligned with that description.

Note that while denoising model $\varepsilon_\theta$ 112 is illustrated as the same model being used iteratively, distinct models may be used at different steps of the process. Further, note that a "denoising diffusion model" may refer to a single denoising model $\varepsilon_\theta$ 112, a chain of multiple denoising models $\varepsilon_\theta$ 112, and/or the iterative use of a single denoising model $\varepsilon_\theta$ 112. A "denoising diffusion model" may also include related features such as decoder 114, any pre-processing that occurs to conditioning input 110, etc. This framework 100 of the training and inference of a denoising diffusion model may further be modified to provide improved results and/or additional functionality, for example as in embodiments described herein.

FIG. 2 is a simplified diagram illustrating a controllable image generation framework 200 according to some embodiments. The framework 200 comprises a fixed diffusion model 212 and a trainable diffusion model 214. Trainable diffusion model 214 may be initialized at the beginning of training with the parameters of fixed diffusion model 212, effectively making it a trainable copy of fixed diffusion model 212. The trainable diffusion model 214 is used to control the fixed diffusion model as is described in detail herein. This allows the framework to take advantage of a fixed diffusion model 212 which is pretrained on a large amount of data, without needing to perform a costly fine-tuning of the parameters of the fixed diffusion model 212. The fixed diffusion model 212 receives a text prompt 202 which is used to indicate to the fixed diffusion model 212 what a user wants to be generated as an output image 216.

In one embodiment, text prompt 202 is also input to trainable diffusion model 214. A visual condition 204 (e.g., an input image used to guide the image generation) is input to mixture of experts (MOE) adapter 208. MOE adapter 208 applies a convolutional kernel to the visual condition 204 to produce a feature map which is used as the input to trainable diffusion model 214. The convolutional kernel applied by MOE adapter 208 is a learned kernel which is specific to a task, identified by the task instruction 206. Task instruction 206 is input to a task-aware encoder 210, which encodes via learned parameters and encodes the task instruction 206 to a feature map. The feature maps from MOE adapter 208 and task aware encoder 210 are used to modulate internal representations of the trainable diffusion model 214. The internal representations of trainable diffusion model 214 are in turn used to modulate internal representations of fixed diffusion model 212. In this way trainable diffusion model 214 controls the fixed diffusion model 212. This allows for the framework to take advantage of a well pre-trained fixed diffusion model 212, while allowing for a high level of control based on a visual condition 204 and task instruction 206. FIGS. 3-6 illustrate further details of framework 200 according to some embodiments.

One example of a visual condition and corresponding task instruction is a "Canny Edge" image with the task being "Canny Edge to Image." A "Canny Edge" image may be a black and white image which shows where various edges of objects should appear in an image. Another example of a visual condition and corresponding task instruction is an "HED" with the instruction "HED to image" where HED is a holistically-nested edge detection. Another example of a visual condition and corresponding task instruction is a "Normal Surface" with an instruction "Normal Surface to Image" where a normal surface is an image which represents 3D shapes by using red/green/blue (RGB) values of the image to correspond to X, Y, and Z axis in 3D space. Another example of a visual condition and corresponding task instruction is a depth map, with the instruction "Depth map to image." A depth map may be an image which indicates depth with luminance values. Another example of a visual condition and corresponding task instruction is a "human skeleton" with the task instruction "human skeleton to image." The "human skeleton" may be a color-coded line drawing indicating the different body parts of a human. Another example of a visual condition and corresponding task instruction is an "object box" image with the instruction "object box to image," where an "object box" image provides bounding boxes for objects. Another example of a visual condition and corresponding task instruction is a partial image, with the instruction "image outpainting" in which the image is completed by generating the missing portion of the image. Another example of a visual condition and corresponding task instruction is a "segmentation" with the instruction "segmentation to image," where a segmentation is an image which illustrates where different objects are including their specific shapes. The methods described herein are not limited to these types of visual conditions and tasks. Even when trained on a subset of specific tasks, as is described herein, the trained model may perform other related tasks via zero-shot learning.

Training may be performed on the trainable diffusion model 214 and or other parameters of the MOE adapter 208 and/or task-aware encoder 210. For example, a training dataset may include a number of different sets of text prompts, visual conditions, and task instructions, and known-good output images. Model parameters may be updated via backpropagation to increase the likelihood of a good image being generated. In some embodiments, the dataset may consist of K tasks: $\mathcal{D} := \{\mathcal{D}_1 \cup \ldots \cup \mathcal{D}_K\}$, and for each task training set $\mathcal{D}_k$, denote the training pairs by ($[c_{text}, c_{task}]$, $I_c$, x), with $c_{task}$ being the task instruction that indicates the task type, $c_{text}$ being the language prompt describing the target image, $I_c$ being the visual conditions, and x being the target image. With the additional task instruction, UniControl can differentiate visual conditions from different tasks. An example training pair may include a visual condition of a Canny Edge map, an text prompt of "Camp on a mountain top: Adventure, Outdoor, Great View" a task instruction of "Canny Edge to Image" and a target output image. With a training pair (x, $[c_{text}, c_{task}]$, $I_c$), the training loss for task k may be defined as $$\ell^k(\theta) := \mathbb{E}_{z,e,t,c_{task},c_{text},I_c}\left[\|\mathcal{E} - \mathcal{E}_\theta(z_t, t, c_{task}, c_{text}, I_c)\|_2^2\right], \quad (1)$$

with ($[c_{task}, c_{text}]$, $I_c$, x)~$\mathcal{D}_k$

Where t represents the time step, $z_t$ is the noise-corrupted latent tensor at time step t, $z_0 = E(x)$, and $\theta$ is the trainable parameters of UniControl. In some embodiments, a percentage of text prompts may be randomly dropped during training in order to enhance the controllability of input visual conditions. In some embodiments, a system performing a training operation first randomly selects a task k and sample a mini-batch from $\mathcal{D}_k$, and optimizes $\theta$ with the calculated loss $\ell^k(\theta)$.

Once trained in this way, the model may perform any of the tasks K as prompted. Additionally, unseen tasks may be performed by the model (i.e., zero shot learning of new tasks). The task instruction may be encoded (e.g., by task-aware encoder 210 or by another encoder) to provide not just an indication of a single predefined task, but an indication of relative values associated with each of the predefined tasks. In this way the tasks on which the model was trained may be used together to perform unseen tasks. To achieve this, the framework may determine task weights based on the relationship between unseen and seen pre-trained tasks. The task weights can be estimated by either manual assignment or calculating the similarity score of task instructions in the embedding space. For example, MOE weights for an unseen task of "colorization" may have task weights as "depth: 0.6, seg: 0.3, canny: 0.1". The MOE adapter 208 can be linearly assembled with the estimated task weights to extract shallow features from the newly unseen visual condition. For example, the convolutional kernels may be combined according to the relative task weights. In another example, feature maps are generated using each of the convolutional kernels (or those with non-zero weights) and the feature maps are combined according to the MOE weights.

Figure 3:
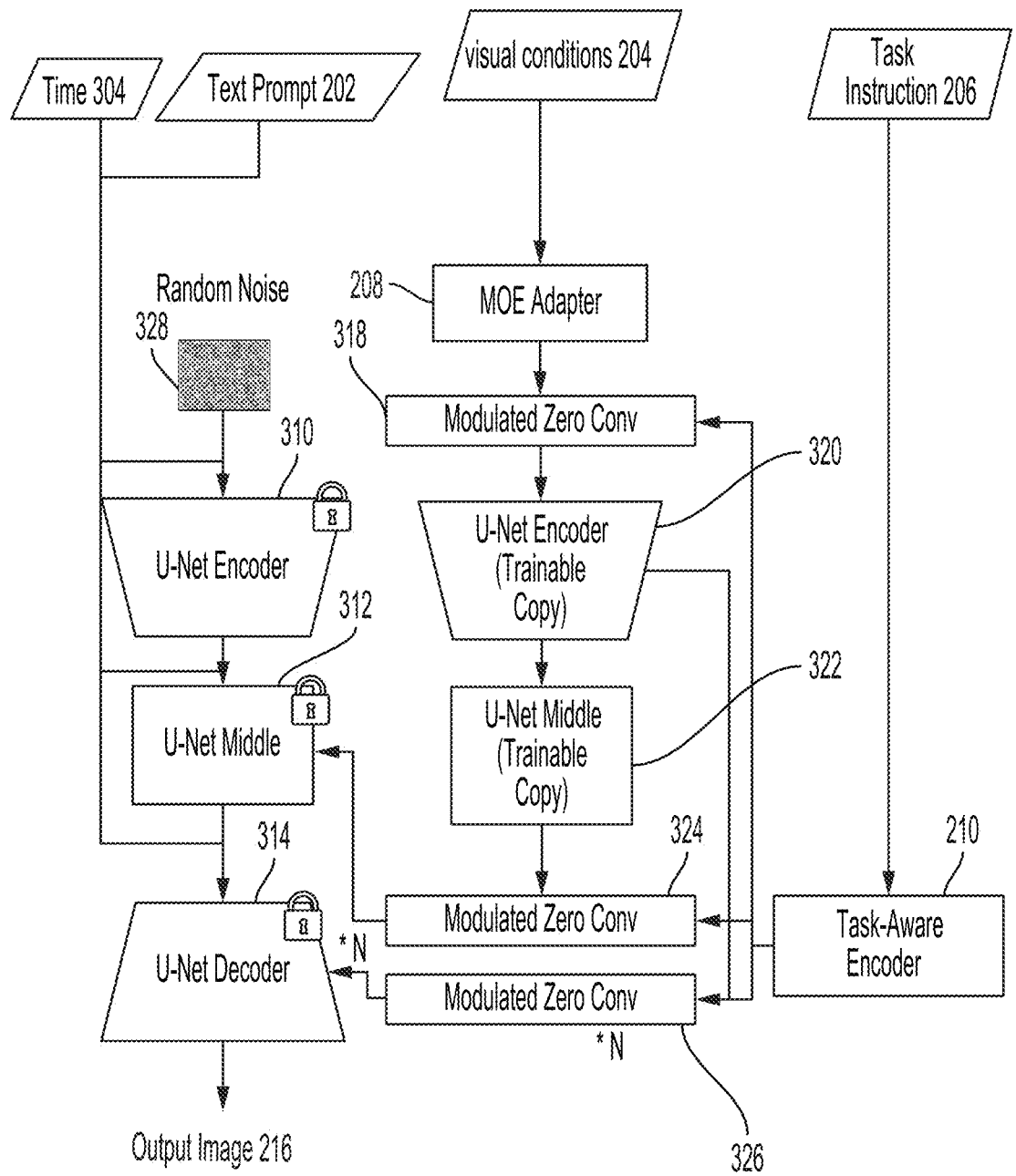
FIG. 3 is a simplified diagram of a fixed diffusion model and a trainable diffusion model, according to some embodiments.

FIG. 3 is a simplified diagram of a fixed diffusion model (e.g., fixed diffusion model 212) and a trainable diffusion model (e.g., trainable diffusion model 214), according to some embodiments. A fixed diffusion model comprising a U-Net encoder 310, U0Net middle 312, and U-Net decoder 314 is controlled by trainable diffusion model comprising a U-Net encoder 320 and U-Net middle 322. As described in FIG. 1, the U-Net encoders and decoders may include multiple layers and produce internal representations (e.g., feature maps) which are passed to subsequent layers. The fixed diffusion model may be initialized with an input of random noise 328, which it may iteratively denoise as guided by the text prompt 202, where a single denoising step may be performed by the combination of the U-Net encoder 310, the U-Net middle 312, and U-Net decoder 314. Multiple denoising steps may be performed by taking the output of the final layer of the U-Net decoder and feeding it back as the input to the first layer of the U-Net encoder 310 and repeating the process. This denoising process may be repeated a number of times (e.g., 50 iterations) to generate a final output image 216. Time 304 may be used as an input to both the fixed diffusion model 212 and the trainable diffusion model 214 which indicates to the model which iteration of denoising is currently being performed.

Visual conditions 204 may be input to MOE adapter 208. MOE Adapter may adapt the visual condition 204 using a convolutional kernel specific to the indicated task. The kernels may be learned during training. The output of the MOE adapter 208 may be a feature map. A task instruction my be input to a task-aware encoder 210, which encodes the task instruction 206 into a corresponding feature map, described in more detail in reference to FIG. 6. Parameters of task-aware encoder 210 may also be learned during training. The feature map output of task-aware encoder 210 may be used to modify the feature map output of MOE adapter 208 via modulated zero convolution 318. modulated zero convolution 318 is parameterized to control by how much the feature map of the task aware encoder 210 modifies the feature map of MOE adapter 208. The "zero" in the name indicates that the initial parameters of modulated zero convolution 318 are set to zero, such that at the start of training the task aware encoder 210 has no effect. As the parameters are updated during training, the task aware encoder 210 may be learned to have a greater effect on the output of MOE adapter 208.

Trainable diffusion model 214 may include a U-Net encoder 320 and a U-Net middle 322. Trainable diffusion model 214 may not include U-Net decoders. The output of MOE adapter 208 as modulated by modulated zero convolution 318 is input to a first layer of U-Net encoder 320. The output of the last layer of U-Net encoder 320 is input to U-Net middle 322. Skip connections from the one or more layers of U-Net encoder 320 are modulated by modulated zero convolution 326. The output of the U-Net middle 322 is modulated by modulated zero convolution 324. As is illustrated and described in reference to FIG. 5, the modulated zero convolution 324 takes the same input as the fixed diffusion model 212 and passes it through a parallel U-Net block, but first it modifies that input by summing it with the task embedding convolved with a zero convolution. The output of the trainable U-Net block is again modified by the task embedding convolved with a zero convolution before it is summed back with the output of the fixed U-Net block. As illustrated in FIG. 3, it is the skip connections which are input to the modulated zero convolutions such that the trainable diffusion model 214 does not require a U-Net decoder.

The parallel U-Net blocks (e.g., U-Net encoder 320 and U-Net middle 322) are conditioned on the visual control signals and are trainable, while the U-Net encoder 310 and U-Net middle 312 are conditioned on random noise and are frozen. The parallel trainable U-Net encoder 320 and U-Net middle 322 serve to take the visual control signals as input and affect the original U-Net's output appearance. The output of each layer of the U-Net encoder 320 has a skip additive connection to the corresponding modulated zero-convolution 326 which modulates the corresponding layer of the U-Net decoder 314. Note that modulated zero convolution 326 may include multiple modulated zero convolutions, for example one for each layer of the U-Net encoder 320. The modulated zero-convolutions 318, 324, and 326 are also modulated by the output of the task-aware encoder 210.

Figure 4:
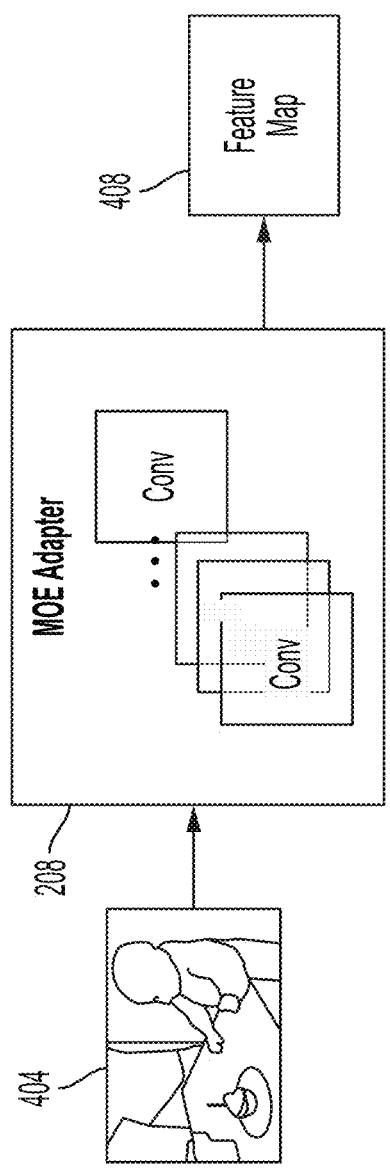
FIG. 4 is a simplified diagram of an input image adapter, according to some embodiments.

FIG. 4 is a simplified diagram of an input image adapter i.e., MOE adapter 208, according to some embodiments. The MOE adapter 208 can learn necessary low-level feature maps from various visual conditions, allowing UniControl to capture unique information from different visual conditions. An input visual condition image 404 is input to MOE adapter 208, and based on a task instruction 206, a convolutional kernel is applied to the visual condition 404 to generate a feature map 408. As described above, for a specific predefined task, the convolutional kernel associated with only that task may be used, and not the other kernels. In some embodiments, for unseen tasks, a combination of kernels may be used based on the embedding of the new task instruction and a comparison of that embedding to the embeddings of the predefined tasks.

Figure 5:
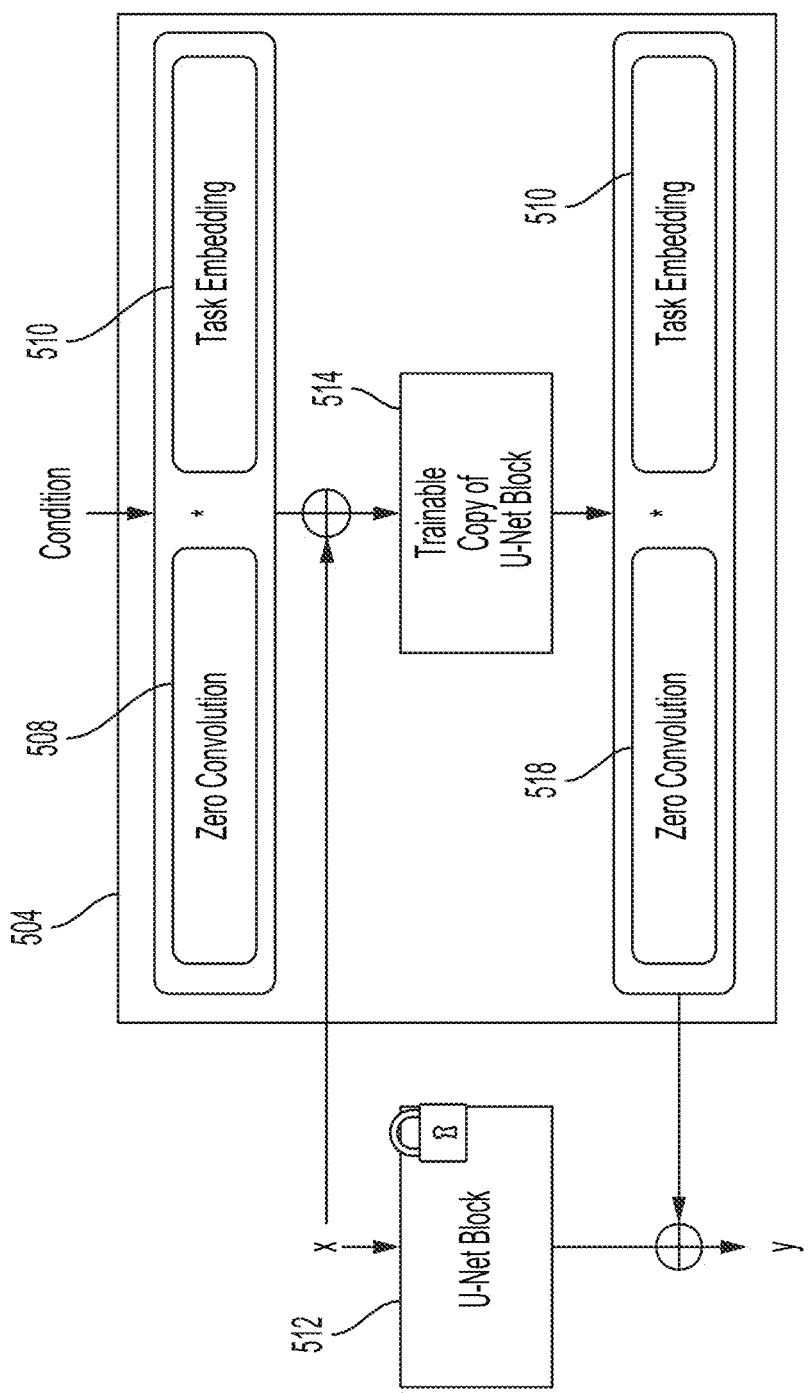
FIG. 5 is a simplified diagram of a diffusion model modulation framework, according to some embodiments.

FIG. 5 is a simplified diagram of a diffusion model modulation framework, according to some embodiments. The modulated zero convolution 504 may be the modulated zero convolution 318, 314, and/or 316 in some embodiments. The modulated zero convolution 504 convolves the input (e.g., a visual condition or an intermediate representation of a visual condition) with a zero convolution 508 multiplied by the task embedding 510. As described above, the zero convolution 508 is a convolutional kernel which is initialized to 0, but obtains useful values during training. The task embedding provides the task-specific modulation of the inputs. The result of the convolution is summed with the input which is being used for the fixed U-Net block 512. The result of the sum is input to the trainable copy of the U-Net block 514. The output of the trainable copy of the U-Net block 514 is then again convolved with a zero convolution 518 multiplied by the task embedding. The result of this convolution is then summed back to the output of the fixed convolution model U-Net block 512. In some embodiments, as is shown in FIG. 3, this is performed on the skip connections of the U-Net. In some embodiments, the zero convolutions may be initialized to some value other than 0.

Figure 6:
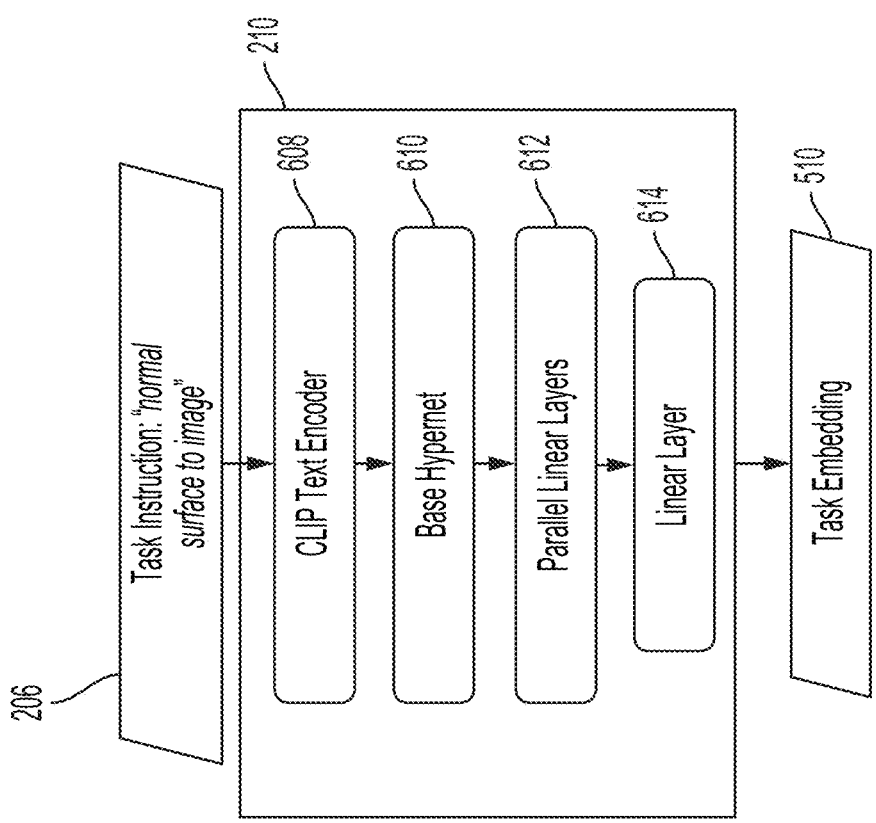
FIG. 6 is a simplified diagram of a task-aware encoder, according to some embodiments.

FIG. 6 is a simplified diagram of a task-aware encoder 210, according to some embodiments. The task-aware encoder 210 (or task-aware "HyperNet") takes the task instruction 206 as an input and outputs a task embedding 510. Task aware encoder 210 may be considered a HyperNet as it is used to modulate weights of the network (e.g., via the zero convolution modulations). The steps illustrated in FIG. 210 are exemplary, and other methods of embedding task instruction 206 may be used. the task-aware encoder 210 first projects the task instruction 206, which may be denoted $c_{task}$ into an intermediate task embedding with the help of an encoder 608 which may be a CLIP Text encoder. In some embodiments, the intermediate embedded task instruction is passed through other layers such as a base hypernet 610, parallel linear layers 612, and/or linear layer 614 in order to generate task embedding 510 in a format which may be accepted by the network. In specific, the length of the task embedding 510 may be the same as the number of input channels of the zero-conv layer, and each element scalar in the embedding is multiplied to the convolution kernel per input channel.

Computer and Network Environment

Figure 7A:
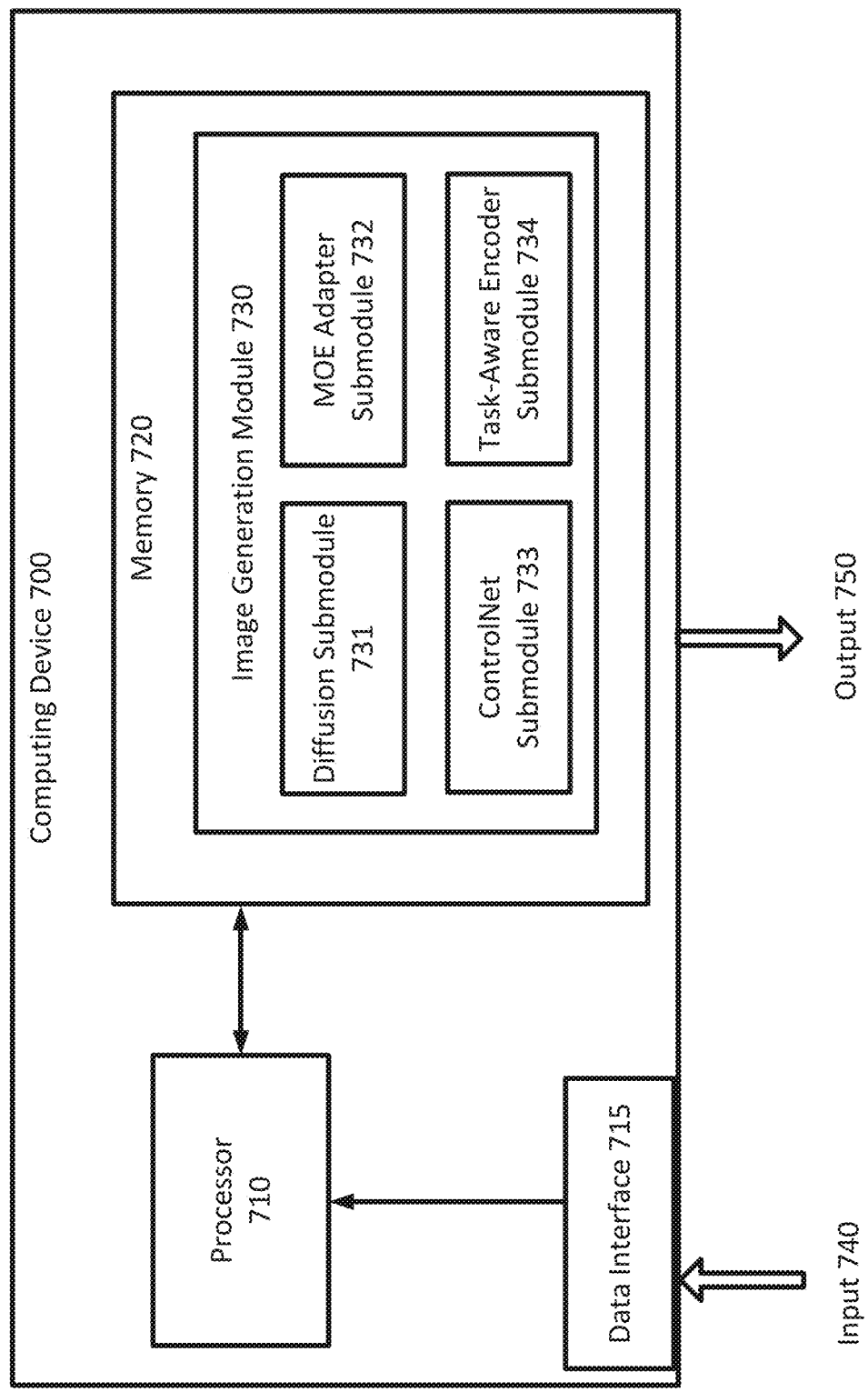
FIG. 7A is a simplified diagram illustrating a computing device implementing the controllable image generation framework described in FIGS. 1-6, according to some embodiments.

FIG. 7A is a simplified diagram illustrating a computing device implementing the controllable image generation framework described in FIGS. 1-6, according to one embodiment described herein. As shown in FIG. 7A, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for image generation module 730 that may be used to implement and/or emulate the systems and models, and/or to implement any of the methods described further herein. image generation module 730 may receive input 740 such as an input training data (e.g., natural language prompts, conditioning images, and task instructions) via the data interface 715 and generate an output 750 which may be a generated image.

The data interface 715 may comprise a communication interface, a user interface (such as a voice input interface, a graphical user interface, and/or the like). For example, the computing device 700 may receive the input 740 (such as a training dataset) from a networked database via a communication interface. Or the computing device 700 may receive the input 740, such as natural language prompts, conditioning images, and task instructions, from a user via the user interface.

In some embodiments, the image generation module 730 is configured to generate an image based on a text prompt, conditioning image, and task instruction. The image generation module 730 may further include diffusion submodule 731 which may include a fixed diffusion model and a trainable diffusion model (e.g., similar to diffusion models 212 and 214 in FIG. 2), mixture of experts (MOE) adapter submodule 732 (e.g., similar to MOE adapter 208 in FIGS. 2-4), ControlNet submodule 733, and task-aware encoder submodule 734 (e.g., similar to task-aware encoder 210 in FIGS. 2-3 and FIG. 6).

Diffusion submodule 731 may be configured to perform denoising diffusion steps of a fixed denoising diffusion model (e.g., diffusion model 212) and/or denoising diffusion steps of a second trainable denoising diffusion model (e.g., diffusion model 214). MOE adapter submodule 732 may be configured to apply a convolutional kernel, or a combination of convolutional kernels, to a visual condition to produce a feature map which is used as the input to a trainable diffusion model (e.g., the functions of MOE adapter 208 described herein). ControlNet submodule 733 may be configured to perform inference using a first model and modulate the output of the first model with the output of a parallel model's output (e.g., as described in FIG. 5). Task-aware encoder submodule 734 may be configured to encode a task instruction as described in FIG. 6

Some examples of computing devices, such as computing device 700 may include non-transitory, tangible, machine readable media that include executable code that when run by one or more processors (e.g., processor 710) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7B:
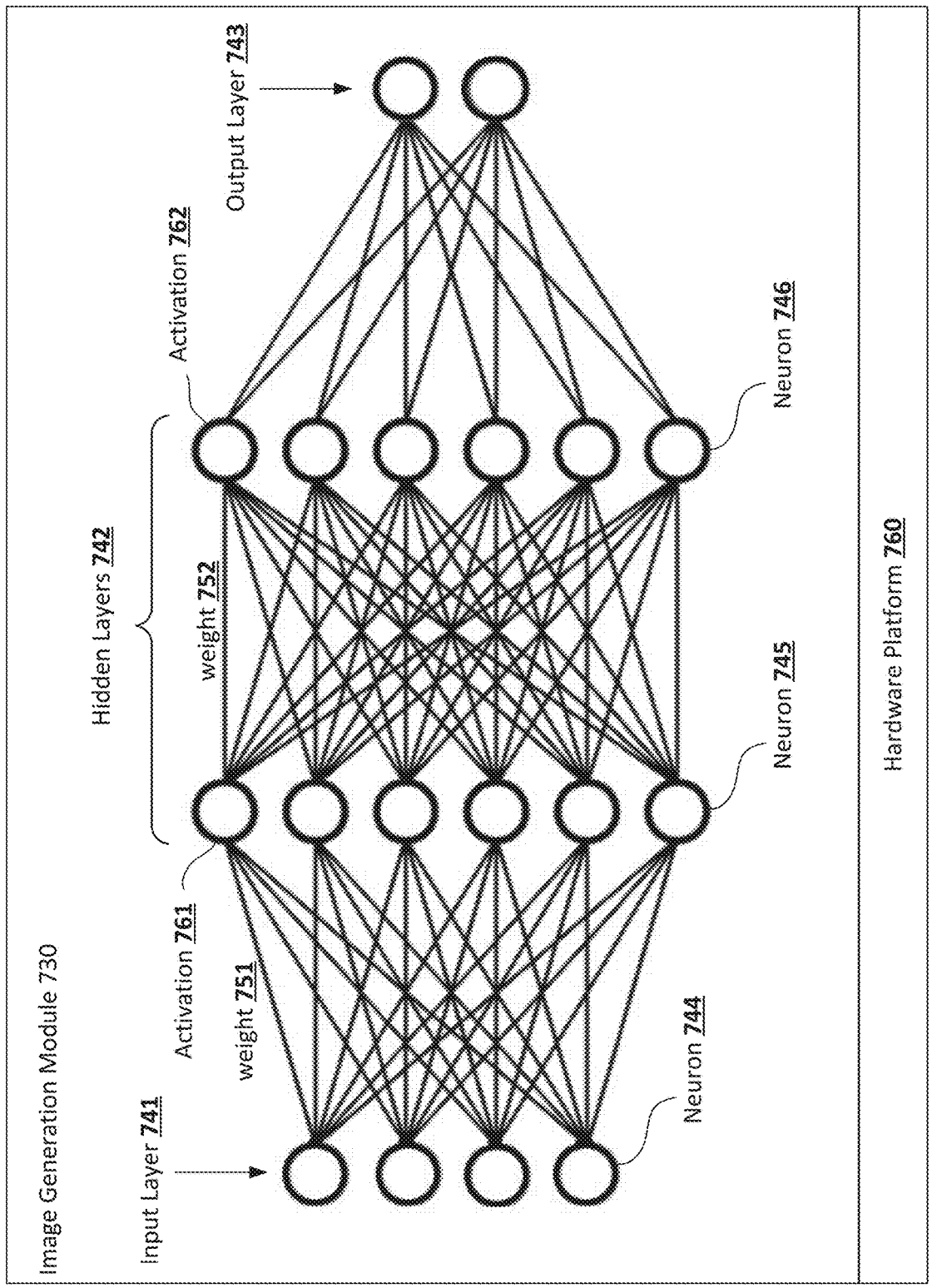
FIG. 7B is a simplified diagram illustrating a neural network structure, according to some embodiments.

FIG. 7B is a simplified diagram illustrating the neural network structure implementing the image generation module 730 described in FIG. 7A, according to some embodiments. In some embodiments, the image generation module 730 and/or one or more of its submodules 731-734 may be implemented at least partially via an artificial neural network structure shown in FIG. 7B. The neural network comprises a computing system that is built on a collection of connected units or nodes, referred to as neurons (e.g., 744, 745, 746). Neurons are often connected by edges, and an adjustable weight (e.g., 751, 752) is often associated with the edge. The neurons are often aggregated into layers such that different layers may perform different transformations on the respective input and output transformed input data onto the next layer.

For example, the neural network architecture may comprise an input layer 741, one or more hidden layers 742 and an output layer 743. Each layer may comprise a plurality of neurons, and neurons between layers are interconnected according to a specific topology of the neural network topology. The input layer 741 receives the input data (e.g., 740 in FIG. 7A), such as a task instruction. The number of nodes (neurons) in the input layer 741 may be determined by the dimensionality of the input data (e.g., the length of a vector of the task instruction). Each node in the input layer represents a feature or attribute of the input.

The hidden layers 742 are intermediate layers between the input and output layers of a neural network. It is noted that two hidden layers 742 are shown in FIG. 7B for illustrative purpose only, and any number of hidden layers may be utilized in a neural network structure. Hidden layers 742 may extract and transform the input data through a series of weighted computations and activation functions.

For example, as discussed in FIG. 7A, the image generation module 730 receives an input 740 of a text prompt, a conditioning image, and a task instruction, and transforms the input into an output 750 of a generated image. To perform the transformation, each neuron receives input signals, performs a weighted sum of the inputs according to weights assigned to each connection (e.g., 751, 752), and then applies an activation function (e.g., 761, 762, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 741 is transformed into rather different values indicative data characteristics corresponding to a task that the neural network structure has been designed to perform.

The output layer 743 is the final layer of the neural network structure. It produces the network's output or prediction based on the computations performed in the preceding layers (e.g., 741, 742). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the image generation module 730 and/or one or more of its submodules 731-734 may comprise the transformative neural network structure of layers of neurons, and weights and activation functions describing the non-linear transformation at each neuron. Such a neural network structure is often implemented on one or more hardware processors 710, such as a graphics processing unit (GPU). An example neural network may be part of a diffusion model encoder and/or decoder layer, and/or the like.

In one embodiment, the image generation module 730 and its submodules 731-734 may be implemented by hardware, software and/or a combination thereof. For example, the image generation module 730 and its submodules 731-734 may comprise a specific neural network structure implemented and run on various hardware platforms 760, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 760 used to implement the neural network structure is specifically configured based on factors such as the complexity of the neural network, the scale of the tasks (e.g., training time, input data scale, size of training dataset, etc.), and the desired performance.

In one embodiment, the neural network based image generation module 730 and one or more of its submodules 731-734 may be trained by iteratively updating the underlying parameters (e.g., weights 751, 752, etc., bias parameters and/or coefficients in the activation functions 761, 762 associated with neurons) of the neural network. For example, during forward propagation, the training data such as text prompts, conditioning images, and task instructions are fed into the neural network. The data flows through the network's layers 741, 742, with each layer performing computations based on its weights, biases, and activation functions until the output layer 743 produces the network's output 750. In some embodiments, output layer 743 produces an intermediate output on which the network's output 750 is based.

The output generated by the output layer 743 is compared to the expected output (e.g., a "ground-truth" such as the corresponding target image) from the training data, to compute a loss function that measures the discrepancy between the predicted output and the expected output. Given the loss, the negative gradient of the loss function is computed with respect to each weight of each layer individually. Such negative gradient is computed one layer at a time, iteratively backward from the last layer 743 to the input layer 741 of the neural network. These gradients quantify the sensitivity of the network's output to changes in the parameters. The chain rule of calculus is applied to efficiently calculate these gradients by propagating the gradients backward from the output layer 743 to the input layer 741.

Parameters of the neural network are updated backwardly from the last layer to the input layer (backpropagating) based on the computed negative gradient using an optimization algorithm to minimize the loss. The backpropagation from the last layer 743 to the input layer 741 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as new text prompts, conditioning images, and/or task instructions.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in image processing/generation.

Figure 8:
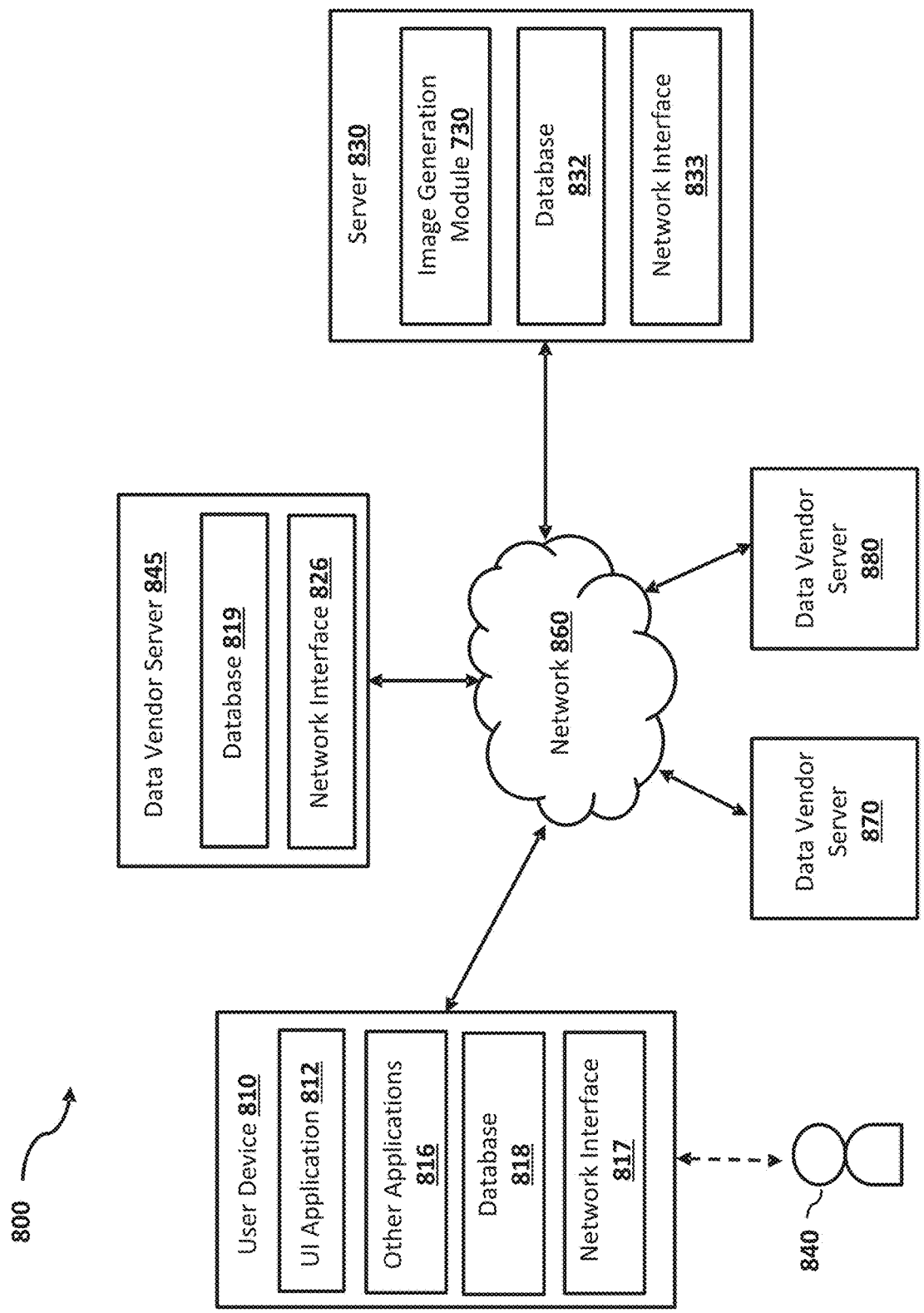
FIG. 8 is a simplified block diagram of a networked system suitable for implementing the image generation framework described in FIGS. 1-7B and other embodiments described herein.

FIG. 8 is a simplified block diagram of a networked system 800 suitable for implementing the image generation framework described in FIGS. 1-7B and other embodiments described herein. In one embodiment, system 800 includes the user device 810 which may be operated by user 840, data vendor servers 845, 870 and 880, server 830, and other forms of devices, servers, and/or software components that operate to perform various methodologies in accordance with the described embodiments. Exemplary devices and servers may include device, stand-alone, and enterprise-class servers which may be similar to the computing device 700 described in FIG. 7A, operating an OS such as a MICROSOFT® OS, a UNIX® OS, a LINUX® OS, or other suitable device and/or server-based OS. It can be appreciated that the devices and/or servers illustrated in FIG. 8 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 810, data vendor servers 845, 870 and 880, and the server 830 may communicate with each other over a network 860. User device 810 may be utilized by a user 840 (e.g., a driver, a system admin, etc.) to access the various features available for user device 810, which may include processes and/or applications associated with the server 830 to receive an output data anomaly report.

User device 810, data vendor server 845, and the server 830 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 800, and/or accessible over network 860.

User device 810 may be implemented as a communication device that may utilize appropriate hardware and software configured for wired and/or wireless communication with data vendor server 845 and/or the server 830. For example, in one embodiment, user device 810 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 810 of FIG. 8 contains a user interface (UI) application 812, and/or other applications 816, which may correspond to executable processes, procedures, and/or applications with associated hardware. For example, the user device 810 may receive a message indicating a generated image from the server 830 and display the message via the UI application 812. In other embodiments, user device 810 may include additional or different modules having specialized hardware and/or software as required.

In various embodiments, user device 810 includes other applications 816 as may be desired in particular embodiments to provide features to user device 810. For example, other applications 816 may include security applications for implementing client-side security features, programmatic client applications for interfacing with appropriate application programming interfaces (APIs) over network 860, or other types of applications. Other applications 816 may also include communication applications, such as email, texting, voice, social networking, and IM applications that allow a user to send and receive emails, calls, texts, and other notifications through network 860. For example, the other application 816 may be an email or instant messaging application that receives a prediction result message from the server 830. Other applications 816 may include device interfaces and other display modules that may receive input and/or output information. For example, other applications 816 may contain software programs for asset management, executable by a processor, including a graphical user interface (GUI) configured to provide an interface to the user 840 to view generated images.

User device 810 may further include database 818 stored in a transitory and/or non-transitory memory of user device 810, which may store various applications and data and be utilized during execution of various modules of user device 810. Database 818 may store user profile relating to the user 840, predictions previously viewed or saved by the user 840, historical data received from the server 830, and/or the like. In some embodiments, database 818 may be local to user device 810. However, in other embodiments, database 818 may be external to user device 810 and accessible by user device 810, including cloud storage systems and/or databases that are accessible over network 860.

User device 810 includes at least one network interface component 817 adapted to communicate with data vendor server 845 and/or the server 830. In various embodiments, network interface component 817 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 845 may correspond to a server that hosts database 819 to provide training datasets including text prompts, conditioning images, and task instructions to the server 830. The database 819 may be implemented by one or more relational database, distributed databases, cloud databases, and/or the like.

The data vendor server 845 includes at least one network interface component 826 adapted to communicate with user device 810 and/or the server 830. In various embodiments, network interface component 826 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 845 may send asset information from the database 819, via the network interface 826, to the server 830.

The server 830 may be housed with the image generation module 730 and its submodules described in FIG. 7A. In some implementations, image generation module 730 may receive data from database 819 at the data vendor server 845 via the network 860 to generate images. The generated images may also be sent to the user device 810 for review by the user 840 via the network 860.

The database 832 may be stored in a transitory and/or non-transitory memory of the server 830. In one implementation, the database 832 may store data obtained from the data vendor server 845. In one implementation, the database 832 may store parameters of the image generation module 730. In one implementation, the database 832 may store previously generated images, and the corresponding input feature vectors.

In some embodiments, database 832 may be local to the server 830. However, in other embodiments, database 832 may be external to the server 830 and accessible by the server 830, including cloud storage systems and/or databases that are accessible over network 860.

The server 830 includes at least one network interface component 833 adapted to communicate with user device 810 and/or data vendor servers 845, 870 or 880 over network 860. In various embodiments, network interface component 833 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 860 may be implemented as a single network or a combination of multiple networks. For example, in various embodiments, network 860 may include the Internet or one or more intranets, landline networks, wireless networks, and/or other appropriate types of networks. Thus, network 860 may correspond to small scale communication networks, such as a private or local area network, or a larger scale network, such as a wide area network or the Internet, accessible by the various components of system 800.

Example Work Flows

Figure 9:
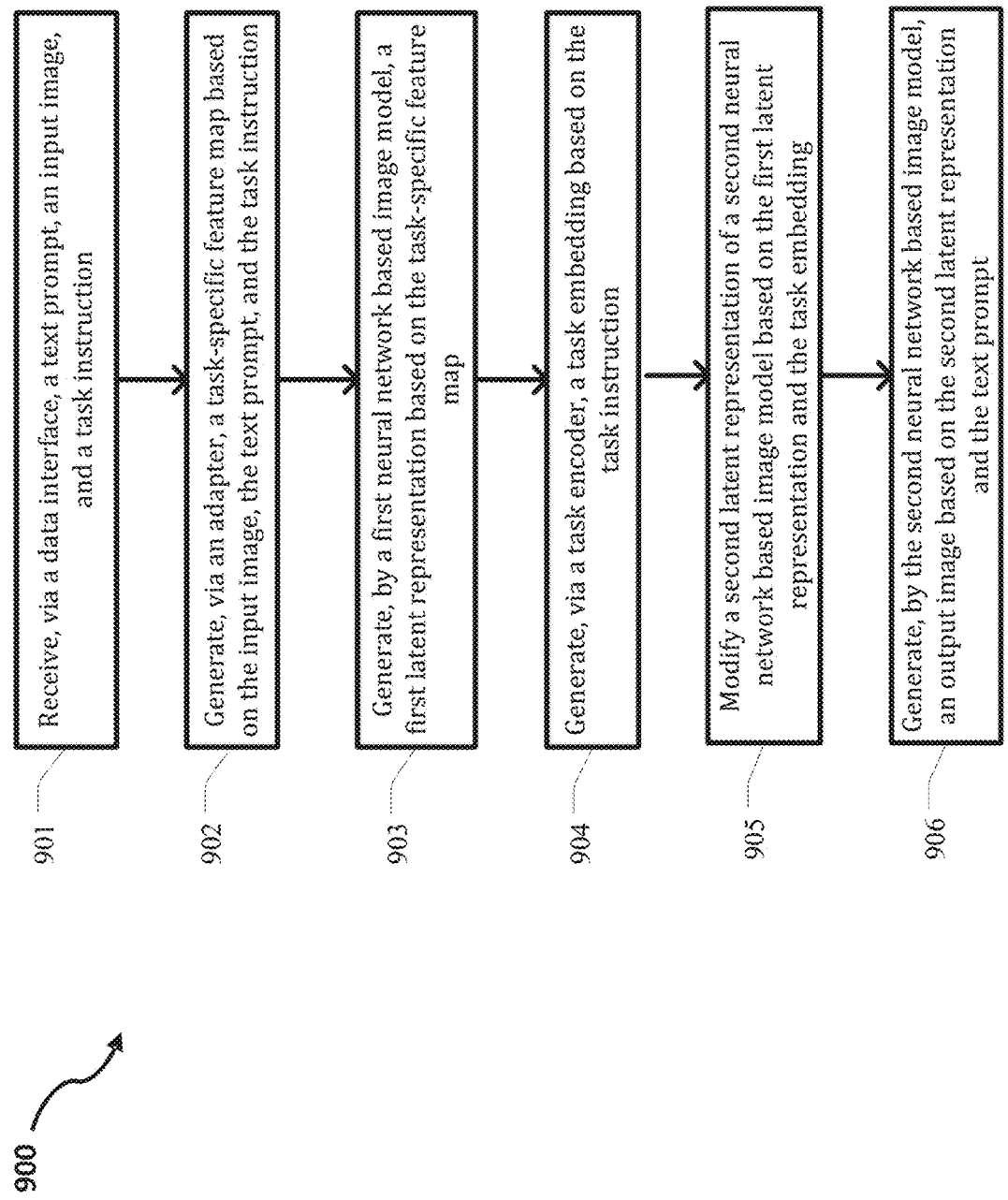
FIG. 9 is an example logic flow diagram illustrating a method of controllable image generation based on the framework shown in FIGS. 1-8, according to some embodiments.

FIG. 9 is an example logic flow diagram illustrating a method of controllable image generation based on the framework shown in FIGS. 1-8, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the operation of the image generation module 730 (e.g., FIGS. 7A and 8).

As illustrated, the method 900 includes a number of enumerated steps, but aspects of the method 900 may include additional steps before, after, and in between the enumerated steps. In some aspects, one or more of the enumerated steps may be omitted or performed in a different order.

At step 901, a system (e.g., computing device 700 or server 830) receives, via a data interface, a text prompt (e.g., text prompt 202), an input image (e.g., visual condition 204), and a task instruction (e.g., task instruction 206). The text prompt may be a natural language prompt, code language, syntax language, symbols, and/or the like.

At step 902, the system generates, via an adapter (e.g., MOE adapter 208), a task-specific feature map (e.g., feature map 408) based on the input image, the text prompt, and the task instruction. In some embodiments, generating the task-specific feature map comprises selecting a convolutional kernel from a set of convolutional kernels based on the task instruction and generating the task-specific feature map based on the input image and the selected convolutional kernel. In some embodiments, generating the task-specific feature map includes selecting two or more convolutional kernels from a set of convolutional kernels based on a comparison of the task instruction to one or more predefined task instructions and generating the task-specific feature map based on the input image and the selected convolutional kernels. Respective weights for each of the selected convolutional kernels may be based on the comparison of the task instruction to the one or more predefined task instructions.

At step 903, the system generates, by a first neural network based image model (e.g., diffusion model 214), a first latent representation based on the task-specific feature map.

At step 904, the system generates, via a task encoder (e.g., task-aware encoder 210), a task embedding based on the task instruction.

At step 905, the system modifies a second latent representation of a second neural network based image model (e.g., diffusion model 212) based on the first latent representation and the task embedding.

At step 906, the system generates, by the second neural network based image model, an output image (e.g., output image 216) based on the second latent representation and the text prompt. The system may further receive, via the data interface, a target image. The system may compute a loss objective based on the output image and the target image, and update parameters of the first neural network based image model, the adapter, and/or the task encoder based on the computed loss objective via backpropagation. In some embodiments, the system may receive, via the data interface, a training dataset including a plurality of task instructions, wherein each of the plurality of task instructions is one of a predefined set of task instructions. The system may train the first neural network based image model, the adapter, and/or the task encoder using the plurality of task instructions. At inference, the task instruction may be different than all of the predefined set of task instructions. As described herein, the task embedding may be used to select one or more convolutional kernels.

Example Results

Figure 10:
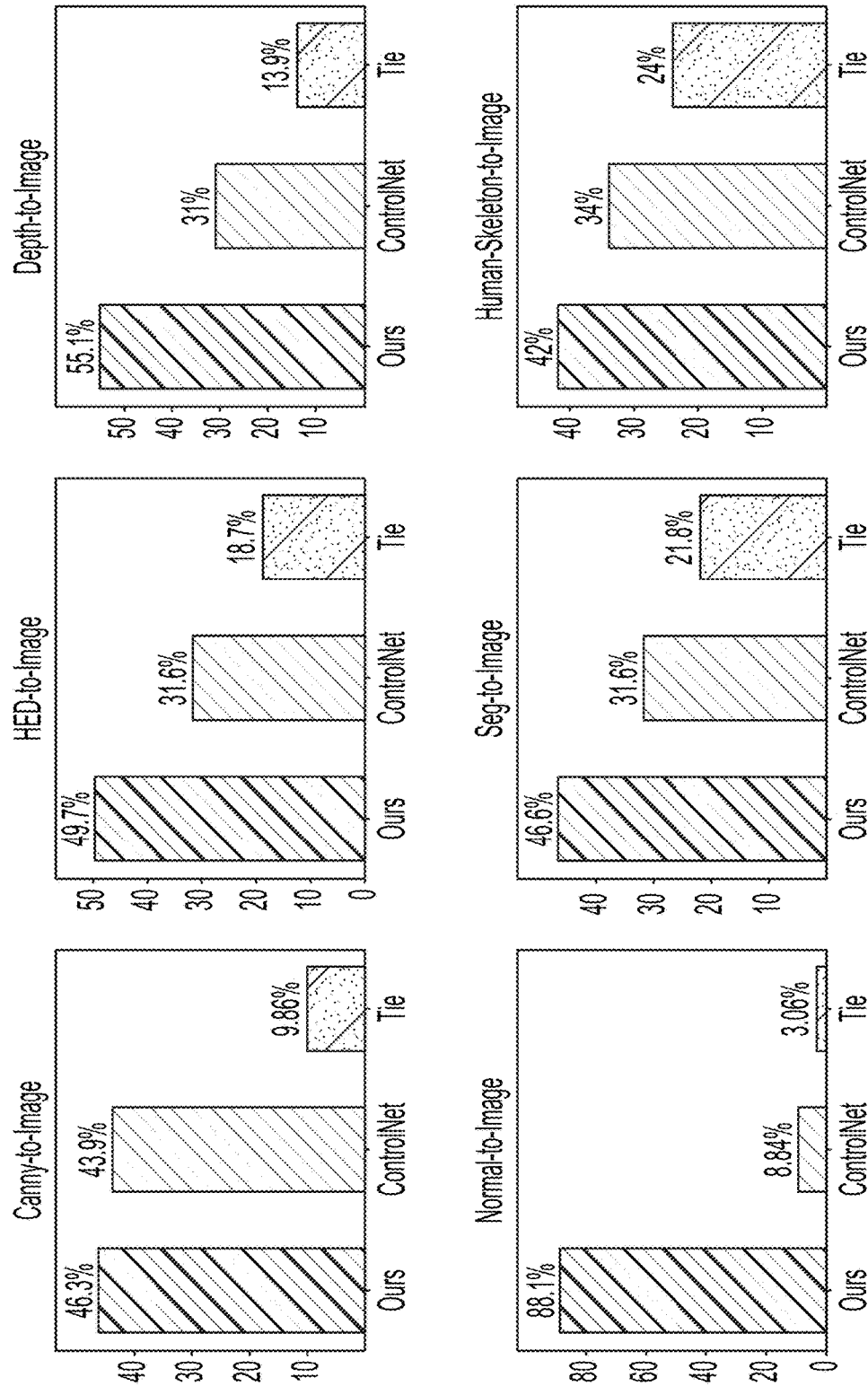
Figure 12:
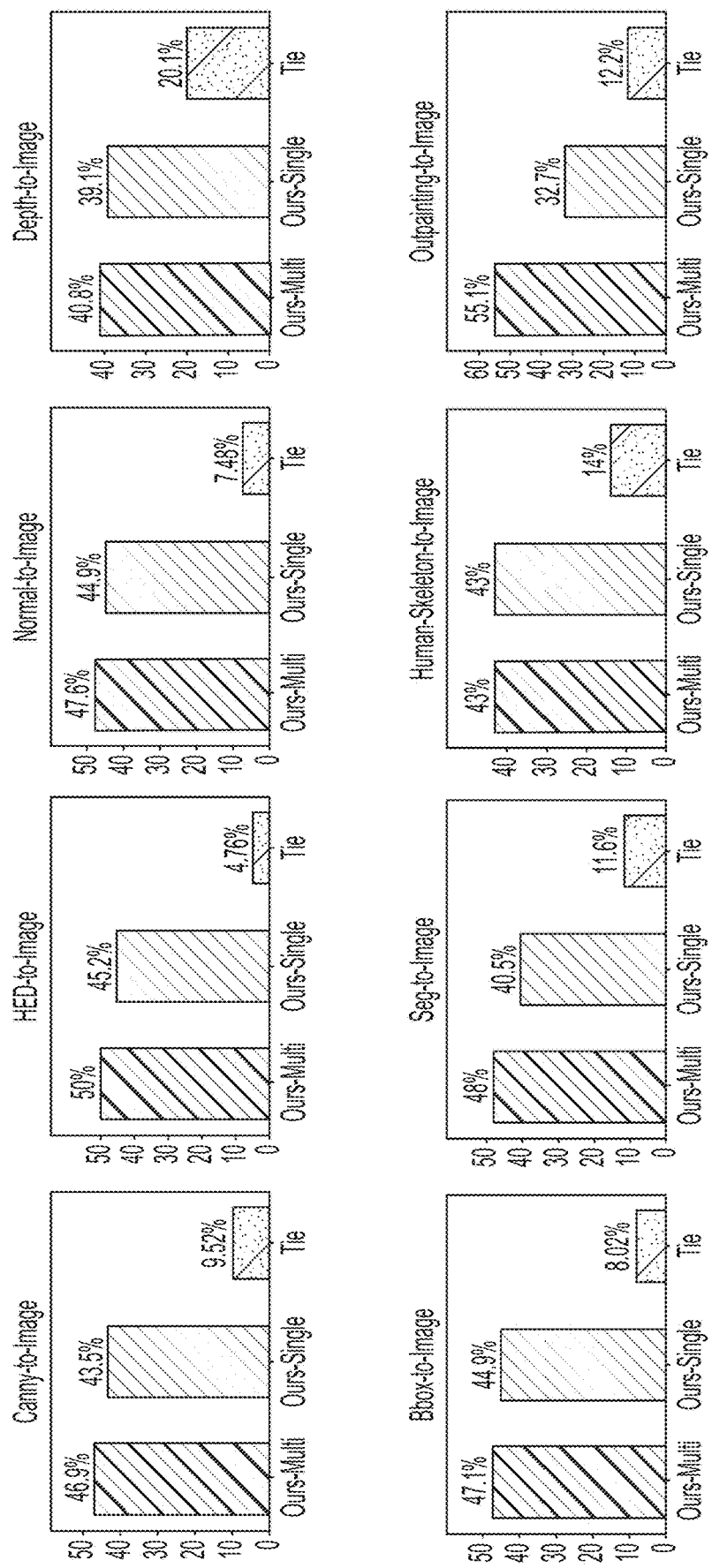

FIGS. 10-12 represent exemplary test results using embodiments described herein.

FIG. 10 illustrates results of a user preference study indicative of model performance between an embodiment of the "UniControl" methods described herein (labeled as "Ours") and a baseline "ControlNet" model on six tasks. The ControlNet baseline model is implemented as described in Zhang and Agrawala, Adding conditional control to text-to-image modelx, arXiv: 2302.05543, 2023. As illustrated, UniControl outperformed Controlnet in each test. In the HED-to-image generation task, UniControl significantly surpasses ControlNet. This superiority is even more pronounced in the depth and normal surface to image generation tasks, where users overwhelmingly favor the UniControl method, demonstrating its ability to handle complex geometric interpretations.

FIG. 11 illustrates a comparison of UniControl to ControlNet on a perceptual distance metric. The perceptual distance metric evaluates the distance between the output image and a ground truth image. A lower value indicates more similar images. As illustrated, UniControl outperforms ControlNet on five tasks, and obtains the same image distance to ControlNet on Segmentation.

FIG. 12 illustrates results of a user preference study indicative of model performance between UniControl and a re-implemented single-task model. FIG. 12 illustrates that the UniControl approach maintains an advantage even over single task-specific models. The results demonstrate UniControl's benefits by effectively discerning image regions to guide content generation. Even in the challenging outpainting task, Unicontrol outperforms the baseline, highlighting its robustness and capacity to generalize.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of image generation, the method comprising:
receiving, via a data interface, a text prompt, an input image, and a task instruction distinct from the text prompt;
generating, via an adapter, a task-specific feature map based on the input image, the text prompt, and the task instruction;
generating, by a first neural network based image model, a first latent representation based on the task-specific feature map;
generating, via a task encoder, a task embedding based on the task instruction;
modifying a second latent representation of a second neural network based image model based on the first latent representation and the task embedding, wherein the second neural network based image model is fixed such that its parameters are not updated after pretraining and the first neural network based image model is a trainable copy of at least an encoder of the second neural network based image model; and
generating, by a decoder of the second neural network based image model, an output image based on the second latent representation and the text prompt.

2. The method of claim 1, wherein the generating the task-specific feature map comprises:

selecting one or more convolutional kernels from a set of convolutional kernels based on the task instruction; and
generating the task-specific feature map based on the input image and the selected one or more convolutional kernel.

3. The method of claim 2, wherein the one or more convolutional kernels are selected based on a comparison of the task instruction to one or more predefined task instructions.

4. The method of claim 3, wherein the generating the task-specific feature map further includes:
estimating a respective weight for each of the selected convolutional kernels based on the comparison.

5. The method of claim 1, further comprising:
receiving, via the data interface, a target image;
computing a loss objective based on the output image and the target image; and
updating parameters of the first neural network based image model, based on the computed loss objective via backpropagation while keeping the second neural network based image model unchanged.

6. The method of claim 1, further comprising:
receiving, via the data interface, a training dataset including training samples corresponding to a plurality of task instructions, wherein each of the plurality of task instructions is one of a predefined set of task instructions; and
training the first neural network based image model using the training samples corresponding to the plurality of task instructions.

7. The method of claim 6, wherein the task instruction is different than any task instruction of the predefined set of task instructions that have been used in training the first neural network based image model.

8. A system for image generation, the system comprising:
a memory that stores a first neural network based image model, a second neural network based image model, and a plurality of processor executable instructions;
a communication interface that receives a text prompt, an input image, and a task instruction distinct from the text prompt; and
one or more hardware processors configured to read and execute the plurality of processor-executable instructions from the memory to perform operations comprising:
generating, via an adapter, a task-specific feature map based on the input image, the text prompt, and the task instruction;
generating, by a first neural network based image model, a first latent representation based on the task-specific feature map;
generating, via a task encoder, a task embedding based on the task instruction;
modifying a second latent representation of a second neural network based image model based on the first latent representation and the task embedding, wherein the second neural network based image model is fixed such that its parameters are not updated after pretraining and the first neural network based image model is a trainable copy of at least an encoder of the second neural network based image mode; and
generating, by a decoder of the second neural network based image model, an output image based on the second latent representation and the text prompt.

9. The system of claim 8, wherein the generating the task-specific feature map comprises:
selecting one or more convolutional kernels from a set of convolutional kernels based on the task instruction; and
generating the task-specific feature map based on the input image and the selected one or more convolutional kernel.

10. The system of claim 9, wherein the one or more convolutional kernels are selected based on a comparison of the task instruction to one or more predefined task instructions.

11. The system of claim 10, wherein the generating the task-specific feature map further includes:
estimating a respective weight for each of the selected convolutional kernels based on the comparison.

12. The system of claim 8, the operations further comprising:
receiving, via a data interface, a target image;
computing a loss objective based on the output image and the target image; and
updating parameters of the first neural network based image model, based on the computed loss objective via backpropagation while keeping the second neural network based image model unchanged.

13. The system of claim 8, the operations further comprising:
receiving, via a data interface, a training dataset including training samples corresponding to a plurality of task instructions, wherein each of the plurality of task instructions is one of a predefined set of task instructions; and
training the first neural network based image model using the training samples corresponding to the plurality of task instructions.

14. The system of claim 13, wherein the task instruction is different than any task instruction of the predefined set of task instructions that have been used in training the first neural network based image model.

15. A non-transitory machine-readable medium comprising a plurality of machine-executable instructions which, when executed by one or more processors, are adapted to cause the one or more processors to perform operations comprising:
receiving, via a data interface, a text prompt, an input image, and a task instruction distinct from the text prompt;
generating, via an adapter, a task-specific feature map based on the input image, the text prompt, and the task instruction;
generating, by a first neural network based image model, a first latent representation based on the task-specific feature map;
generating, via a task encoder, a task embedding based on the task instruction;
modifying a second latent representation of a second neural network based image model based on the first latent representation and the task embedding, wherein the second neural network based image model is fixed such that its parameters are not updated after pretraining and the first neural network based image model is a trainable copy of at least an encoder of the second neural network based image model; and
generating, by a decoder of the second neural network based image model, an output image based on the second latent representation and the text prompt.

16. The non-transitory machine-readable medium of claim 15, wherein the generating the task-specific feature map comprises:

selecting one or more convolutional kernels from a set of convolutional kernels based on the task instruction; and generating the task-specific feature map based on the input image and the selected one or more convolutional kernel.

17. The non-transitory machine-readable medium of claim 16, wherein the one or more convolutional kernels are selected based on a comparison of the task instruction to one or more predefined task instructions.

18. The non-transitory machine-readable medium of claim 17, wherein the generating the task-specific feature map further includes:

estimating a respective weight for each of the selected convolutional kernels based on the comparison.

19. The non-transitory machine-readable medium of claim 15, the operations further comprising:

receiving, via the data interface, a target image;

computing a loss objective based on the output image and the target image; and updating parameters of the first neural network based image model, based on the computed loss objective via backpropagation while keeping the second neural network based image model unchanged.

20. The non-transitory machine-readable medium of claim 15, the operations further comprising:

receiving, via the data interface, a training dataset including training samples corresponding to a plurality of task instructions, wherein each of the plurality of task instructions is one of a predefined set of task instructions; and training the first neural network based image model using the training samples corresponding to the plurality of task instructions.

* * * * *